(12) United States Patent  
Arikuma et al.

(10) Patent No.: US 11,689,594 B2  
(45) Date of Patent: Jun. 27, 2023

(54) INFORMATION PROCESSING APPARATUS, SERVER ALLOCATION APPARATUS, METHOD, AND COMPUTER READABLE MEDIUM

(71) Applicant: NEC Corporation, Tokyo (JP)

(72) Inventors: Takeshi Arikuma, Tokyo (JP); Takatoshi Kitano, Tokyo (JP); Yusufumi Hirakawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 93 days.

(21) Appl. No.: 17/441,764

(22) PCT Filed: Mar. 28, 2019

(86) PCT No.: PCT/JP2019/013848  
§ 371 (c)(1),  
(2) Date: Sep. 22, 2021

(87) PCT Pub. No.: WO2020/194735  
PCT Pub. Date: Oct. 1, 2020

(65) Prior Publication Data  
US 2022/0182429 A1 Jun. 9, 2022

(51) Int. Cl.  
*H04L 65/61* (2022.01)

(52) U.S. Cl.  
CPC .................................. *H04L 65/61* (2022.05)

(58) Field of Classification Search  
CPC .......................................... H04L 65/61  
USPC ........................................ 709/231  
See application file for complete search history.

(56) References Cited

U.S. PATENT DOCUMENTS

| 2011/0074970 A1 | 3/2011 | Sukegawa |
| 2014/0010865 A1 | 4/2014 | Saito |
| 2016/0055037 A1 | 2/2016 | Iwamatsu |

FOREIGN PATENT DOCUMENTS

| JP | 2006-252304 A | 9/2006 | |
| JP | 2011-70576 A | 4/2011 | |
| JP | 2014-78160 A | 5/2014 | |
| WO | 2016/027452 A1 | 2/2016 | |
| WO | WO-2016027452 A1 * | 2/2016 | ............. G06F 9/505 |

OTHER PUBLICATIONS

International Search Report for PCT Application No. PCT/JP2019/013848, dated Jul. 2, 2019.  
Arikuma, Takeshi et al., "Proposal of large-scale time-series distributed processing method far real-time behavior detection", Proceedings of the 80th National Convention of IPSJ, Mar. 13, 2018, pp. 5-6.

* cited by examiner

Primary Examiner — Glenford J Madamba

(57) ABSTRACT

A data division unit divides each of a plurality of stream data pieces input in a time series into divided data by a predetermined time unit. Each of a plurality of data processing units executes predetermined processing on the stream data. An allocation determination unit determines a combination of the divided data of each of the plurality of stream data pieces and the data processing unit executing the predetermined processing on each of the divided data pieces based on a correlation between processing loads on the plurality of stream data pieces. A data distribution unit distributes the divided data to the data processing unit in accordance with the combination determined by the allocation determination unit.

18 Claims, 19 Drawing Sheets

COMBINATION MATRIX C OF SERVER AND CAMERA

|  | CAMERA 1 | CAMERA 2 | CAMERA 3 | CAMERA 4 | CAMERA 5 | CAMERA 6 | . . . |
|---|---|---|---|---|---|---|---|
| SERVER 1 | 1 | 0 | 1 | 1 | 0 | 0 | |
| SERVER 2 | 0 | 1 | 0 | 0 | 1 | 1 | |
| . . . | | | | | | | |

Fig. 12

STAYING TIME IN SERVER 1

| CAMERA | AVERAGE OF STAYING TIMES |
|---|---|
| 001 | 23 SECONDS |
| 003 | 10 SECONDS |
| 004 | 4 SECONDS |

STAYING TIME IN SERVER 2

| CAMERA | AVERAGE OF STAYING TIMES |
|---|---|
| 002 | 18 SECONDS |
| 005 | 8 SECONDS |
| 006 | 3 SECONDS |

Fig. 13

| CAMERA | AVERAGE OF NUMBERS OF SUBJECTS | LAST TIME | MATRIX C | |
|---|---|---|---|---|
| 001 | 10 | SERVER 1 | SERVER 1 | |
| 002 | 3 | SERVER 2 | SERVER 2 | |
| 003 | 15 | SERVER 1 | SERVER 1 | |
| 004 | 5 | SERVER 2 | SERVER 1 | } SERVER IS CHANGED |
| 005 | 17 | SERVER 1 | SERVER 2 | |
| 006 | 8 | SERVER 2 | SERVER 2 | |

Fig. 14

| CAMERA | MATRIX C | LOAD AT TIME OF ADJUSTMENT | AFTER ADJUSTMENT |
|---|---|---|---|
| 001 | SERVER 1 | 6 | SERVER 1 |
| 002 | SERVER 2 | 19 | SERVER 2 |
| 003 | SERVER 1 | 15 | SERVER 1 |
| 004 | SERVER 1 | 2 | SERVER 1 |
| 005 | SERVER 2 | 23 | SERVER 2 |
| 006 | SERVER 2 | 4 | SERVER 1 |

Fig. 16

INFORMATION PROCESSING APPARATUS, SERVER ALLOCATION APPARATUS, METHOD, AND COMPUTER READABLE MEDIUM

This application is a National Stage Entry of PCT/JP2019/013848 filed on Mar. 28, 2019, the contents of all of which are incorporated herein by reference, in their entirety.

TECHNICAL FIELD

The present disclosure relates to an information processing apparatus, a server allocation apparatus, a method, and a computer readable medium.

BACKGROUND ART

As a related art, a monitoring system that performs monitoring by integrating a plurality of cameras installed at a plurality of points is known. For example, Patent Literature 1 discloses an image processing apparatus used in a monitoring system. In Patent Literature 1, a plurality of cameras are disposed at places different from each other. The image processing apparatus includes a plurality of detection units that detect object regions from input images. In the image processing apparatus, a connection method control unit controls the connections between the plurality of respective cameras and the plurality of respective detection units in accordance with a priority set for each camera.

In Patent Literature 1, the priority of the camera that captures a video image in which a large number of face regions have been detected is set to be high, and the priority of the camera that captures a video image in which a small number of face regions have been detected is set to be low. The connection method control unit controls the connections between the plurality of respective cameras and the plurality of respective detection units so that images captured by the camera having a high priority are input to the plurality of detection units. By doing so, images in which a large number of face regions have been detected and a processing load thus becomes high can be processed by the plurality of detection units in a shared manner.

Further, as another related art, Patent Literature 2 discloses an information processing apparatus that performs, by a plurality of nodes, distributed processing of sensor data input in a time series. In Patent Literature 2, a server node divides time series data so that parts of respective adjacent pieces of divided data overlap each other on the time series. The server node distributes the divided data to a plurality of client nodes. The respective client nodes perform prediction calculation for the divided data in parallel, and transmit the obtained calculation results to the server node. The server node aggregates the calculation results received from the client nodes along the time series. In Patent Literature 2, since the time series data can be processed in parallel by the plurality of client nodes, it is possible to perform processing for the time series data at a high speed.

CITATION LIST

Patent Literature

Patent Literature 1: Japanese Unexamined Patent Application Publication No.
Patent Literature 2: Japanese Unexamined Patent Application Publication No.

SUMMARY OF INVENTION

Technical Problem

Incidentally, there is a need to detect a time-series pattern for staying in one place, wobbling, and the like for a certain period of time by utilizing the time-series data stream of the image analysis result. In particular, in the field of public safety, it is important for practical use to perform detection of such a time-series pattern in real time on a group of time-series data streams of a large number of cameras.

When pieces of divided data are processed in parallel by a plurality of nodes (servers), the utilization efficiency of the node can be enhanced by processing the divided data of time series data obtained from a plurality of cameras, for example, in one node. However, in this case, when the processing load of the divided data becomes high, the node may no longer be able to process the divided data of the time-series data obtained from the plurality of cameras within a predetermined time.

In Patent Literature 1, images of a camera in which a large number of face regions have been detected are input to a plurality of detection units. In Patent Literature 1, since images of one camera having a high processing load are input to the plurality of detection units, there is a problem that the utilization efficiencies of the detection units are low. Regarding Patent Literature 2, if pieces of divided data of a plurality of cameras are allocated to one client node, the utilization efficiency of the node can be enhanced. However, in this case, when the number of subjects in the camera data allocated to the same client node simultaneously increases, the processing load in the client node rapidly increases, so that the processing may not be completed within a predetermined time. In this case, the time (a delay time) until the processing result is obtained becomes longer.

In view of the above-described circumstances, an object of the present disclosure is to provide an information processing apparatus, a server allocation apparatus, a method, and a computer readable medium that are capable of reducing a delay time until a processing result is obtained while achieving a high node utilization rate.

Solution to Problem

In order to achieve the aforementioned object, the present disclosure provides an information processing apparatus including: a data division unit configured to divide each of a plurality of stream data pieces input in a time series into divided data by a predetermined time unit; a plurality of data processing units each configured to execute predetermined processing on the stream data; an allocation determination unit configured to determine, based on a correlation between processing loads on the plurality of stream data pieces, a combination of the divided data of each of the plurality of stream data pieces and the data processing unit executing the predetermined processing on each of the divided data pieces; and a data distribution unit configured to distribute the divided data to the data processing unit in accordance with the combination determined by the allocation determination unit.

Further, the present disclosure provides a server allocation apparatus including: a data division unit configured to divide each of a plurality of stream data pieces input in a time series into divided data by a predetermined time unit; and an allocation determination unit configured to determine, based on a correlation between processing loads on the plurality of stream data pieces, a combination of a plurality of data processing units each executing predetermined processing on the stream data and the divided data of each of the plurality of stream data pieces.

Further, the present disclosure provides a server allocation method including: dividing each of a plurality of stream data pieces input in a time series into divided data by a predetermined time unit; and determining, based on a correlation between processing loads on the plurality of stream data pieces, a combination of one of a plurality of servers and the divided data of each of the plurality of stream data pieces, each of the plurality of servers being configured to execute predetermined processing on the stream data.

The present disclosure provides a computer readable medium storing a program for causing a computer to: divide each of a plurality of stream data pieces input in a time series into divided data by a predetermined time unit; and determine, based on a correlation between processing loads on the plurality of stream data pieces, a combination of one of a plurality of servers and the divided data of each of the plurality of stream data pieces, each of the plurality of servers being configured to execute predetermined processing on the stream data.

Advantageous Effects of Invention

An information processing apparatus, a server allocation apparatus, a method, and a computer readable medium according to the present disclosure are capable of preventing or reducing the increase in a delay time until a processing result is obtained while achieving a high node utilization rate.

BRIEF DESCRIPTION OF DRAWINGS

FIG. 12 is a diagram showing a specific example of a combination matrix C;

FIG. 13 is a diagram showing a specific example of calculation of a load fluctuation score;

FIG. 14 is a diagram showing a specific example of calculation of a data movement amount score;

FIG. 16 is a diagram showing a specific example of the adjustment of the combination.

DESCRIPTION OF EMBODIMENTS

Figure 1:
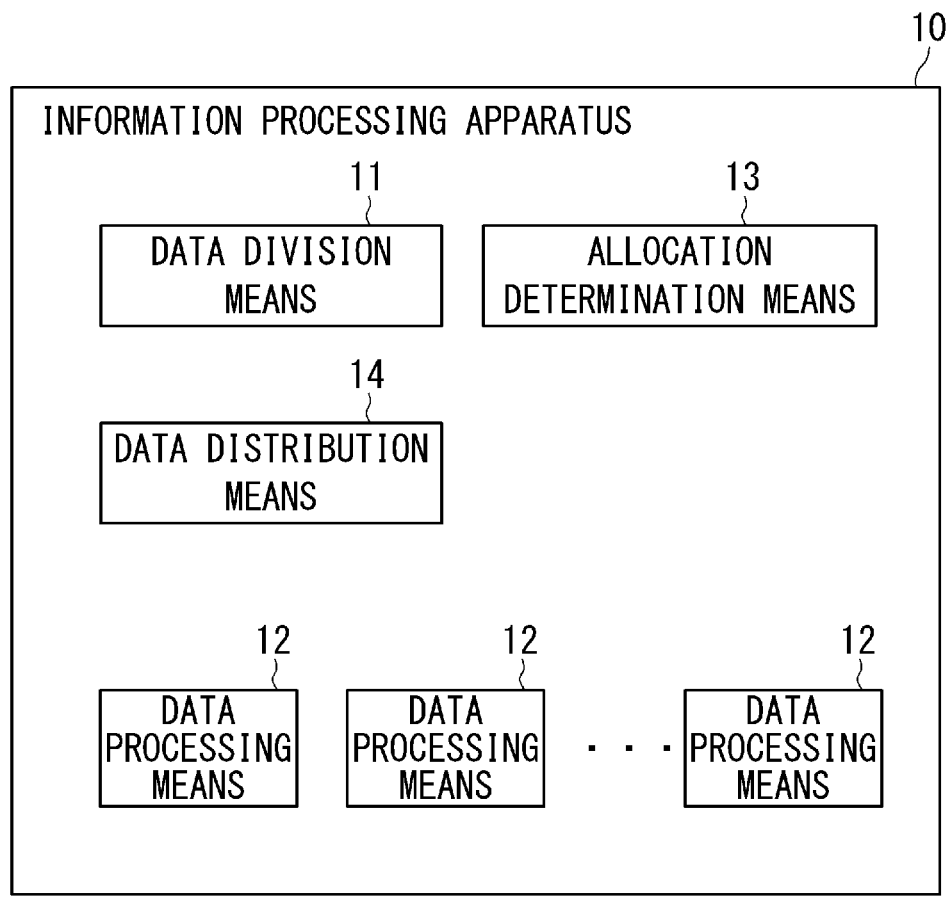
FIG. 1 is a block diagram schematically showing an exemplary information processing apparatus according to the present disclosure.

Prior to describing an example embodiment according to the present disclosure, an overview of the example embodiment will be given. FIG. 1 is a block diagram schematically showing an exemplary information processing apparatus according to the present disclosure. An information processing apparatus 10 includes data division means 11, a plurality of data processing means 12, allocation determination means 13, and data distribution means 14. The data division means 11 divides each of a plurality of stream data pieces input in a time series into divided data by a predetermined time unit. Each data processing means 12 executes predetermined processing on the stream data.

The allocation determination means 13 determines a combination of the divided data of each of the plurality of stream data pieces and the data processing means 12 for executing predetermined processing on each of the divided data pieces. The allocation determination means 13 determines the combination based on a correlation between data processing loads of the plurality of stream data pieces. The data distribution means 14 distributes the divided data to the data processing means 12 in accordance with the combination determined by the allocation determination means 13.

In the information processing apparatus 10, the allocation determination means 13 determines a combination of the divided data of each of the stream data pieces and the data processing means for executing processing on this divided data based on a correlation between processing loads of the plurality of stream data pieces. The allocation determination means 13 allocates, for example, divided data of two stream data pieces having similar respective patterns of changes of the processing loads to the data processing means 12 different from each other. By doing so, it is possible to prevent or reduce the increase in a delay time until a processing result is obtained in each data processing means 12 while increasing a node utilization rate of the data processing means 12.

Figure 2:
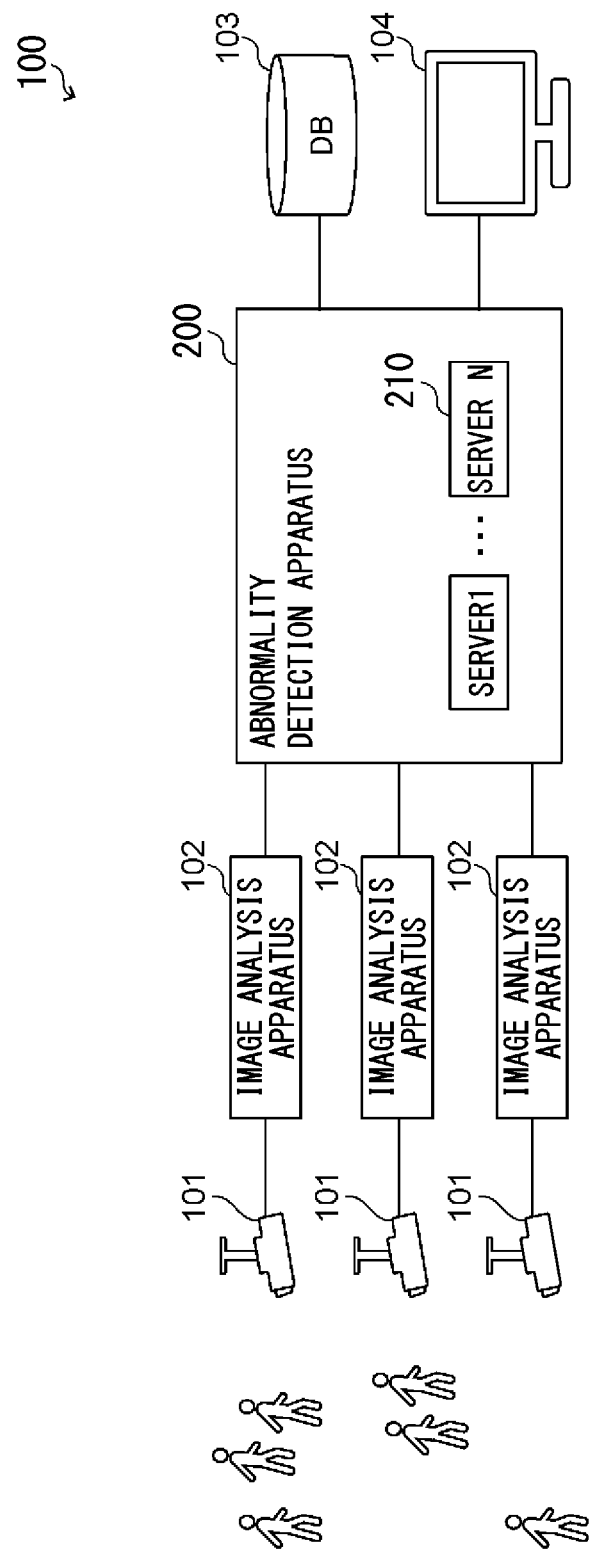
FIG. 2 is a block diagram schematically showing a monitoring system including an information processing apparatus according to an example embodiment of the present disclosure.

Hereinafter, the example embodiment according to the present disclosure will be described in detail with reference to the drawings. FIG. 2 is a block diagram schematically showing a monitoring system including the information processing apparatus according to the example embodiment of the present disclosure. A monitoring system 100 is configured as a system used, for example, for the purpose of detecting a suspicious-looking person in real time and thus preventing a crime from occurring. The monitoring system 100 includes a plurality of monitoring cameras 101, a plurality of image analysis apparatuses 102, an abnormality detection apparatus 200, a data base (DB) 103, and a monitoring terminal 104.

Each monitoring camera 101 captures a region to be monitored and outputs the captured image (moving image data). Each monitoring camera 101 is installed in a monitoring area where people come and go, such as an airport, a station, or a shopping mall. Each monitoring camera 101 includes, for example, an image pickup device, an Analog/

Digital (A/D) conversion circuit, and an image processing circuit. The monitoring camera 101 outputs image data (moving image data) at a predetermined frame rate. The monitoring camera 101 may output moving image data encoded in a predetermined format.

Each image analysis apparatus 102 analyzes moving image data output from the monitoring camera 101 in real time and outputs information indicating a result of the analysis. The image analysis apparatus 102 extracts, for example, a subject such as a person or an object from the moving image data, and generates subject information. The subject information includes, for example, information about the number of subjects, a flow line of each subject, and a feature value (e.g., an orientation of the face) of each subject. For example, the flow line is represented as a coordinate sequence indicating a position of the subject for each time using spatial coordinates set in the monitoring area of each monitoring camera. The image analysis apparatus 102 outputs the subject information obtained by the real-time analysis as stream data.

Note that although FIG. 2 shows three sets of the monitoring camera 101 and the image analysis apparatus 102, the number of monitoring cameras 101 and the number of image analysis apparatuses 102 are not limited to particular numbers. The number of monitoring cameras 101 may be, for example, several hundreds to several thousands. In the monitoring system 100, the plurality of monitoring cameras 101 may be installed so as to correspond to monitoring areas different from each other in a facility such as an airport, a station, or a shopping mall. Alternatively, the plurality of monitoring cameras 101 may include cameras located in another facility.

Further, although FIG. 2 shows an example in which the monitoring camera 101 and the image analysis apparatus 102 are disposed in a one-to-one relationship, the present disclosure is not limited thereto. The monitoring system 100 may have, for example, a configuration in which one image analysis apparatus 102 is disposed for the plurality of monitoring cameras 101. In this case, the image analysis apparatus 102 may output the subject information obtained from each of the monitoring cameras 101 as stream data.

The abnormality detection apparatus 200 performs analysis processing on stream data input from each image analysis apparatus 102. The abnormality detection apparatus 200 includes a plurality of servers (nodes) 210. Each server 210 performs analysis processing on the stream data input from each image analysis apparatus 102. The abnormality detection apparatus 200 uses the plurality of servers 210 to perform distributed processing on the stream data input from each image analysis apparatus 102. A large amount of stream data can be processed at a high speed by processing the stream data in parallel in the plurality of servers 210. The abnormality detection apparatus 200 corresponds to the information processing apparatus 10 shown in FIG. 1.

Note that each server 210 does not necessarily have to be part of the abnormality detection apparatus 200. For example, each server 210 may be configured as a separate apparatus different from the abnormality detection apparatus 200. Alternatively, each server 210 may be configured as a cloud server disposed on a network. The server 210 corresponds to the data processing means 12 shown in FIG. 1.

The database 103 stores a result of the analysis processing performed by the abnormality detection apparatus 200. The database 103 is provided in an auxiliary storage device such as a hard disk device. Alternatively, the database 103 may be provided in a storage server or the like connected through a network. The monitoring terminal 104 issues a warning to a user (a person who performs monitoring) based on the result of the analysis processing performed by the abnormality detection apparatus 200. The monitoring terminal 104 may display position information of the detected subject.

For example, the abnormality detection apparatus 200 detects a subject displaying abnormal behavior immediately, for example, within five seconds, based on the input subject information. The person who performs monitoring checks whether an abnormality has occurred and the position of the subject displaying abnormal behavior by using the monitoring terminal 104. In the event of an abnormality, the person who performs monitoring rushes a security guard or the like to the scene. In this way, the occurrence of a crime or the like can be prevented. The monitoring terminal 104 is configured as, for example, a personal computer or a monitoring server.

Figure 3:
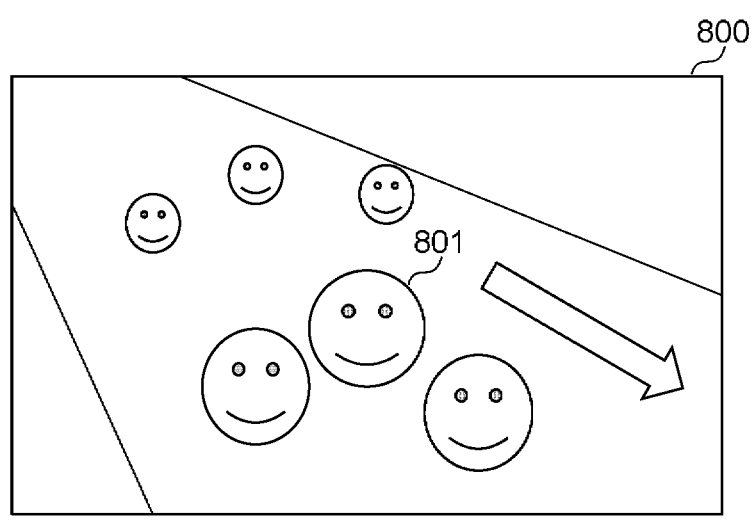
FIG. 3 is a diagram showing an example of image data captured by a monitoring camera.

FIG. 3 shows an example of image data captured by the monitoring camera 101. The monitoring camera 101 captures moving image data indicating a flow (movement) of a subject such as a person or a vehicle to be monitored. Image data 800 shown in FIG. 3 corresponds to image data of one frame of moving image data output from the monitoring camera 101. The monitoring camera 101 captures, for example, a one-way passage in an airport. In the image data 800, a person 801, who is a subject, moves from the left back of the image to the right front thereof. The image analysis apparatus 102 detects a person from the image data shown in FIG. 3 and, for example, tracks the detected person.

Figure 4:
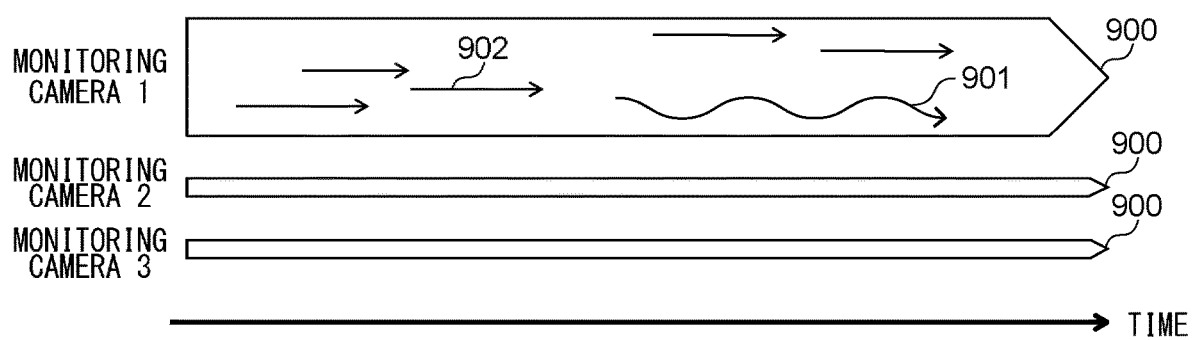
FIG. 4 is a diagram conceptually showing stream data.

FIG. 4 conceptually shows stream data input to the abnormality detection apparatus 200. Stream data indicating a result of the analysis of moving image data captured by using the monitoring camera 101 is input from the image analysis apparatus 102 to the abnormality detection apparatus 200. In FIG. 4, three pieces of the stream data 900 respectively indicating results of the analysis of the moving image data pieces of the monitoring cameras 1 to 3 are input to the abnormality detection apparatus 200.

The stream data 900 includes, for example, a coordinate sequence (time-series coordinates) indicating a flow line of each subject. In FIG. 4, the flow lines of the respective subjects are conceptually shown using arrows. In FIG. 4, a flow line 901 of the wavy arrow indicates the flow line of the subject showing abnormal behavior, such as wobbling or staying in one place, in the spatial coordinates. On the other hand, a flow line 902 of the straight arrow indicates the flow line of the subject showing normal behavior, that is, non-abnormal behavior. The abnormality detection apparatus 200 executes analysis processing for detecting the flow line 901 showing the aforementioned abnormal behavior from the stream data 900.

Figure 5:
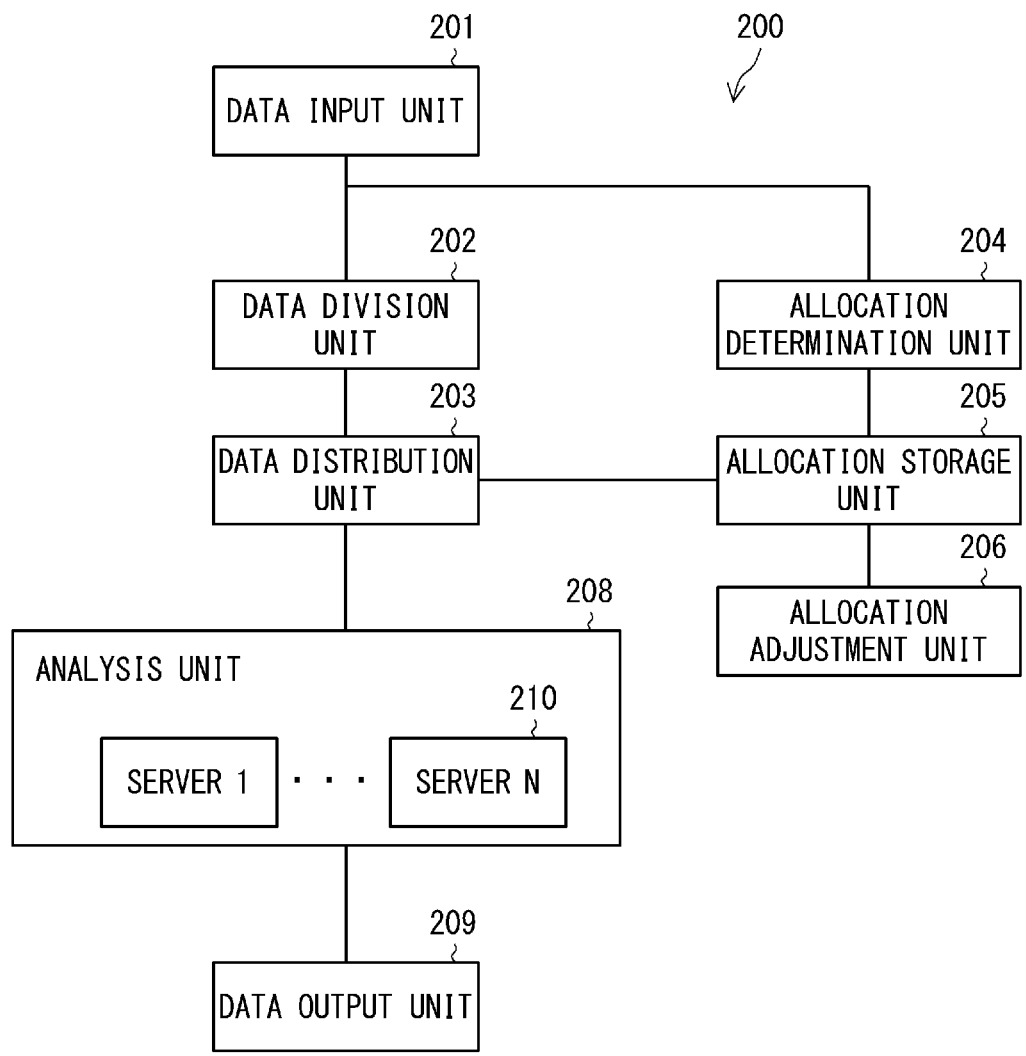
FIG. 5 is a block diagram showing a configuration example of an abnormality detection apparatus.

FIG. 5 shows a configuration example of the abnormality detection apparatus 200. The abnormality detection apparatus 200 includes a data input unit 201, a data division unit 202, a data distribution unit 203, an allocation determination unit 204, an allocation storage unit 205, an allocation adjustment unit 206, an analysis unit 208, and a data output unit 209. In the abnormality detection apparatus 200, the data division unit 202, the allocation determination unit 204, and the allocation adjustment unit 206 correspond to a server allocation apparatus that determines allocation of the servers 210 and stream data (its divided data).

Figure 6:
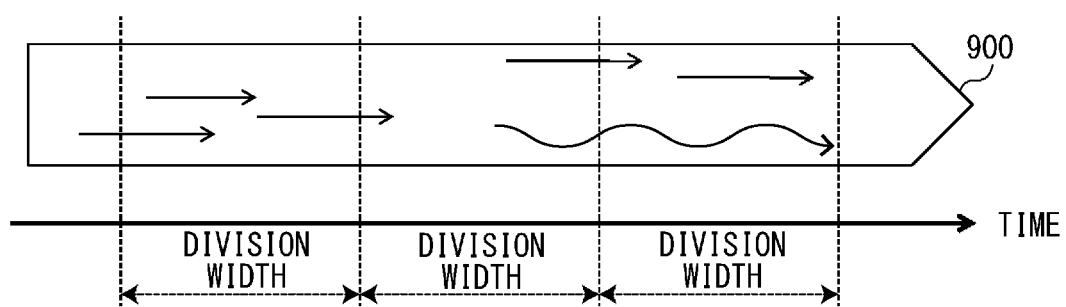
FIG. 6 is a diagram showing an example in which the stream data is divided.

The data input unit 201 receives a plurality of stream data pieces to be analyzed from the outside of the abnormality detection apparatus 200. In this example embodiment, the data input unit 201 receives a plurality of stream data pieces from the image analysis apparatus 102 corresponding to each monitoring camera 101. The data division unit 202 divides the stream data received by the data input unit 201 by a predetermined time width. FIG. 6 shows an example in which the stream data is divided. The data division unit 202 divides the stream data 900 by a predetermined time division width. FIG. 6 shows an example in which the stream data 900 is divided into three pieces of divided data 900a, 900b, and 900c. The data division unit 202 outputs the divided data of each stream data to the data distribution unit 203. The data division unit 202 corresponds to the data division means 11 shown in FIG. 1.

The data distribution unit 203 distributes the divided data of the stream data to the plurality of servers 210. In this example embodiment, it is assumed that the number of servers 210 is smaller than that of monitoring cameras 101 (stream data pieces). In this case, pieces of divided data of the stream data of the plurality of monitoring cameras 101 are distributed to at least some of the plurality of servers 210. In other words, at least some of the plurality of servers 210 perform analysis processing on the divided data of the stream data of the plurality of monitoring cameras 101. The allocation determination unit 204 determines a combination of the divided data of each stream data and the server 210 that performs analysis processing on this divided data. The allocation determination unit 204 corresponds to the allocation determination means 13 shown in FIG. 1, and the data distribution unit 203 corresponds to the data distribution means 14 shown in FIG. 1.

Here, it can be considered that a processing load of the analysis processing on the divided data changes depending on the number of subjects included in the divided data. For example, in the analysis processing, a flow line of each subject is analyzed. In this case, as the number of subjects in the divided data increases, the number of targets of which the flow lines are to be analyzed increases, and thus the processing load increases. For example, assume a case in which one server 210 performs analysis processing on stream data (its divided data) of one monitoring camera 101 and stream data of another monitoring camera 101. In this case, when the number of subjects included in the respective image data pieces simultaneously increases in the one monitoring camera 101 and the other monitoring camera 101, the processing load increases in the server 210. When the processing load exceeds the processing capacity of the server 210, a load overflow may occur and the server 210 may not be able to complete the analysis processing within a predetermined time.

Therefore, in this example embodiment, the allocation determination unit 204 determines a combination of the divided data and the server 210 based on a correlation between the data processing loads of the plurality of stream data pieces. The allocation determination unit 204 calculates a correlation (a correlation coefficient) between temporal changes of the data processing loads of two monitoring cameras 101. As described above, it can be considered that the processing load in the server 210 depends on the number of subjects in the stream data (the divided data). In this example embodiment, the number of subjects included in the stream data is used as an index indicating the processing load of the server 210. For example, the allocation determination unit 204 allocates the divided data pieces of two monitoring cameras 101 in which respective temporal changes (change patterns) in the numbers of subjects included in the stream data are similar to each other to the servers 210 different from each other.

Figure 7A:
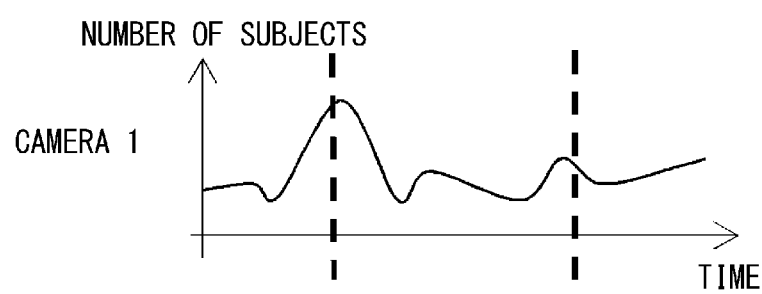
FIG. 7A is a graph showing a temporal change in the number of subjects included in the stream data.
Figure 7B:
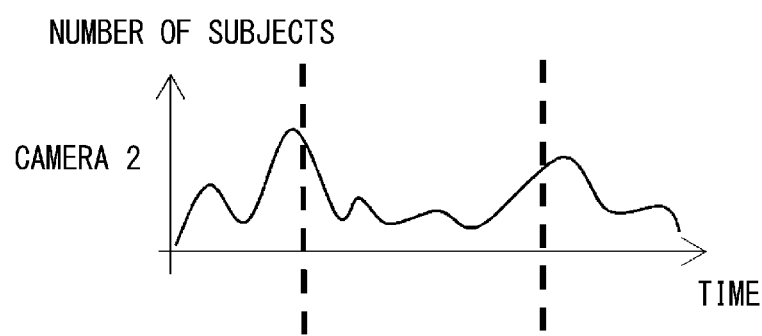
FIG. 7B is a graph showing a temporal change in the number of subjects included in the stream data.
Figure 7C:
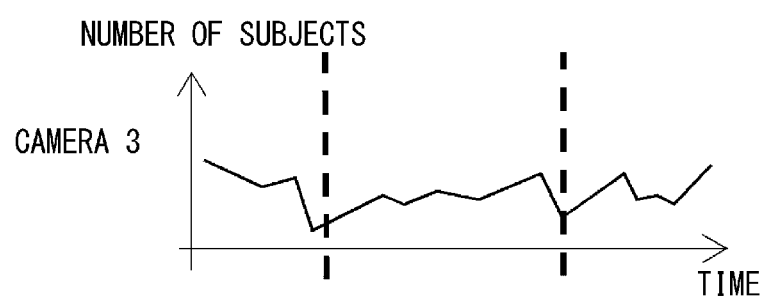
FIG. 7C is a graph showing a temporal change in the number of subjects included in the stream data.

FIGS. 7A to 7C are graphs each showing a temporal change in the number of subjects included in the stream data. In the graphs shown in FIGS. 7A to 7C, the horizontal axis indicates the time and the vertical axis indicates the number of subjects. The allocation determination unit 204 holds, for example, information about the number of subjects in a time range of several tens of minutes to several hours in the past for each monitoring camera 101. The allocation determination unit 204 calculates a correlation coefficient between a temporal change in the number of subjects of a camera 1 shown in FIG. 7A and a temporal change in the number of subjects of a camera 2 shown in FIG. 7B. The allocation determination unit 204 calculates a correlation coefficient between the temporal change in the number of subjects of the camera 1 and a temporal change in the number of subjects of a camera 3 shown in FIG. 7C. Further, the allocation determination unit 204 calculates a correlation coefficient between the temporal change in the number of subjects of the camera 2 and the temporal change in the number of subjects of the camera 3.

When FIG. 7A is compared with FIG. 7B, there is a similarity between the change pattern of the number of subjects in the camera 1 and the change pattern of the number of subjects in the camera 2. For example, the time when the number of subjects has a maximum value in the camera 1 coincides with the time when the number of subjects has a maximum value in the camera 2. In this case, the correlation between the change pattern of the number of subjects in the camera 1 and the change pattern of the number of subjects in the camera 2 is strong. On the other hand, when FIG. 7A is compared with FIG. 7C, the change pattern of the number of subjects in the camera 1 is not similar to the change pattern of the number of subjects in the camera 3. In this case, the correlation between the change pattern of the number of subjects in the camera 1 and the change pattern of the number of subjects the camera 3 is weak. The allocation determination unit 204 determines the combination of the divided data and the server so that the divided data pieces of the cameras 1 and 2 having a strong correlation with each other are not allocated to the same server 210.

Here, since the number of combinations of the monitoring camera 101 and the server 210 is enormous, it is not practical to calculate a correlation for all the combinations. The allocation determination unit 204 may select a predetermined number of the monitoring cameras 101 to be allocated and sequentially determine the servers 210 to which the divided data pieces of the selected monitoring cameras 101 are allocated. In this case, the allocation determination unit 204 calculates, for example, a correlation between a temporal change of the analysis processing load in each of the monitoring cameras 101 (the stream data) that have been allocated to the respective servers 210 and a temporal change of the analysis processing load in the monitoring camera 101 to be allocated. The allocation determination unit 204 calculates, for each server, a percentage of the allocated monitoring cameras 101 having strong correlations with the temporal change of the analysis processing load in the monitoring camera 101 to be allocated. The allocation determination unit 204 may allocate the monitoring camera 101 to be allocated to the server 210 in which the percentage of the monitoring cameras 101 having strong correlations of the processing loads is the lowest.

The allocation determination unit 204 may determine the combination of the divided data and the server 210 based on a frequency of a load fluctuation of the analysis processing as well as the correlation of the analysis processing loads. For example, in some of the monitoring cameras 101, the number of subjects may vary greatly and thus the analysis processing load may suddenly fluctuate. When the divided data pieces of the plurality of monitoring cameras 101 in which the number of subjects unexpectedly increases are allocated to the same server 210, the numbers of subjects may accidentally increase at the same time as each other, although the correlation of the processing loads is low. When the analysis processing load of the divided data allocated to the server 210 exceeds the processing capacity of the server 210, a load overflow occurs, and the analysis processing cannot be completed within a predetermined time. The allocation determination unit 204 may prevent an unexpected load overflow by allocating the divided data of the monitoring camera 101 in which the processing load is likely to fluctuate to another server 210.

It can be considered that the frequency of the load fluctuation of the analysis processing for each monitoring camera 101 is related to the time (staying time) during which a subject stays in the area where the image is captured by the monitoring camera 101. The staying time can be defined, for example, as a period of time from when a subject enters in the frame of image data and is detected to when the subject moves out of the frame of the image data. When the staying time is long, it can be considered that it is unlikely that the number of subjects rapidly increases or decreases, because the subject moves relatively slowly. On the other hand, when the staying time is short, it can be considered that the change in the number of subjects is relatively large, because the subject moves in a capturing range of the monitoring camera 101 in a short period of time. The allocation determination unit 204, for example, may calculate an average staying time of the subjects for each monitoring camera 101 and determine the combination of the divided data and the server 210 based on the correlation of the temporal changes in the number of subjects and the average staying time.

Here, a time width of the stream data referred to by the analysis processing performed in each server 210 may be longer than the time width of the divided data. In this case, each server 210 may combine several pieces of divided data and perform analysis processing on the combined data. For example, when the server 210 to which a certain monitoring camera 101 is allocated is changed, the data distribution unit 203 transmits past divided data necessary for the analysis processing to the changed server 210 in addition to the divided data of the latest time. When the certain monitoring camera 101 is continuously allocated to the same server 210, the server 210 only needs to obtain the divided data of the latest time.

In the above case, when the server 210 that performs the analysis processing on the divided data pieces of the same monitoring camera 101 is changed, some of the past divided data pieces are transmitted to the changed server 210, and thus a data transfer load is increased. Further, a transfer delay due to the data transfer occurs. A data amount of stream data changes in accordance with the number of subjects, and the aforementioned transfer load and transfer delay increase as the number of subjects included in the stream data increases.

The allocation determination unit 204 may evaluate as to how much data transfer (movement) is required when the combination is changed, and determine the combination of the divided data and the server 210 in consideration of a result of the evaluation. The allocation determination unit 204 may, for example, calculate evaluation values (scores) for the aforementioned correlation between the temporal changes of the processing loads, the aforementioned load fluctuation, and the aforementioned data movement, respectively, and determine a combination of the divided data and the server 210 based on the sum of these evaluation values (scores).

When a combination of the divided data of each monitoring camera 101 and the server 210 is determined, the allocation determination unit 204 stores this combination in the allocation storage unit 205. The allocation storage unit 205 stores, for example, an Identifier (ID) of the stream data in association with an ID of the server 210. The allocation adjustment unit (the allocation adjustment means) 206 evaluates whether or not there is a server 210 in which the processing load exceeds its processing capacity when the divided data is allocated to each server 210 in the combination determined by the allocation determination unit 204. When the server 210 in which the processing load exceeds its processing capacity is present, the allocation adjustment unit 206 adjusts allocation by allocating part of the allocated divided data to another server.

The allocation adjustment unit 206 evaluates the processing load of each server 210 when, for example, the divided data is allocated to each server in the combination determined by the allocation determination unit 204. The allocation adjustment unit 206, for example, adds up, for each server 210, the total number of subjects included in the divided data to be allocated. When a server 210 in which the total number of subjects exceeds its processing capacity is present, the allocation adjustment unit 206 determines to move part of the divided data from this server to a server in which the total number of subjects is the smallest. In this case, the allocation adjustment unit 206 changes the server ID stored so as to correspond to the divided data to be moved in the allocation storage unit 205.

The data distribution unit 203 distributes divided data obtained by dividing the stream data of each monitoring camera 101 to the servers 210 in accordance with the correspondence relation with the IDs stored in the allocation storage unit 205. The data distribution unit 203, for example, refers to the allocation storage unit 205 and adds to each divided data the ID (the server ID) of the server 210 that processes the divided data. The data distribution unit 203 outputs the divided data to which the server ID has been added to the analysis unit 208.

The analysis unit 208 includes the plurality of servers 210 for performing distributed processing, and a control unit (not shown) for controlling the plurality of servers 210. The server 210 corresponds to the data processing means 12 shown in FIG. 1. The control unit causes the server 210 corresponding to the server ID added to each divided data to process the divided data. One or a plurality of different divided data pieces are distributed (allocated) to the respective servers 210, and the respective servers 210 perform analysis processing of the allocated divided data. Each server 210 outputs an analysis result obtained by the analysis processing. The analysis result includes, for example, information about a subject in which suspicious behavior is detected.

The data output unit 209 integrates analysis results output from each of the plurality of servers 210 to create stream data (an analysis result stream) of the analysis results for each stream data. The data output unit 209 transmits the created analysis result stream to external apparatuses such as the database 103 and the monitoring terminal 104.

Figure 8:
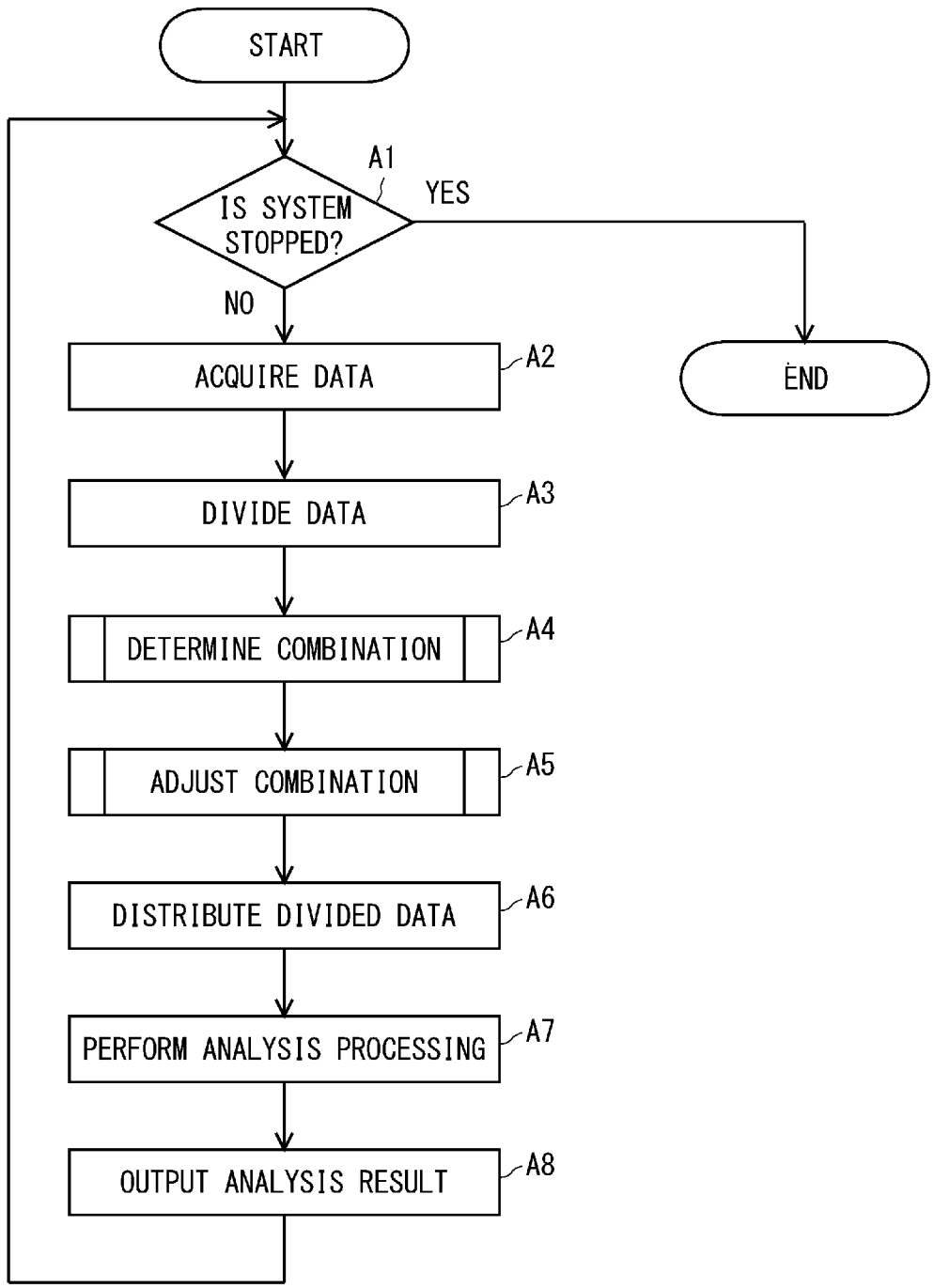
FIG. 8 is a flowchart showing an operation procedure of the abnormality detection apparatus.

Next, an operation procedure will be described. FIG. 8 shows an operation procedure (an abnormality detection method) of the abnormality detection apparatus 200. The abnormality detection apparatus 200 determines whether or not the system is stopped (Step A1). When the abnormality detection apparatus 200 determines that the system is stopped, it ends processing.

If it is determined in Step A1 that the system is not stopped, the data input unit 201 acquires stream data from the image analysis apparatuses 102 corresponding to the respective monitoring cameras 101 (Step A2). In Step A2, the data input unit 201 acquires, for example, stream data including subject information output in a time series from each of the image analysis apparatuses 102. The data division unit 202 divides each of the acquired stream data pieces by a predetermined time width (Step A3). The allocation determination unit 204 determines a combination of the divided data and the server 210 that processes this divided data (Step A4).

Figure 9:
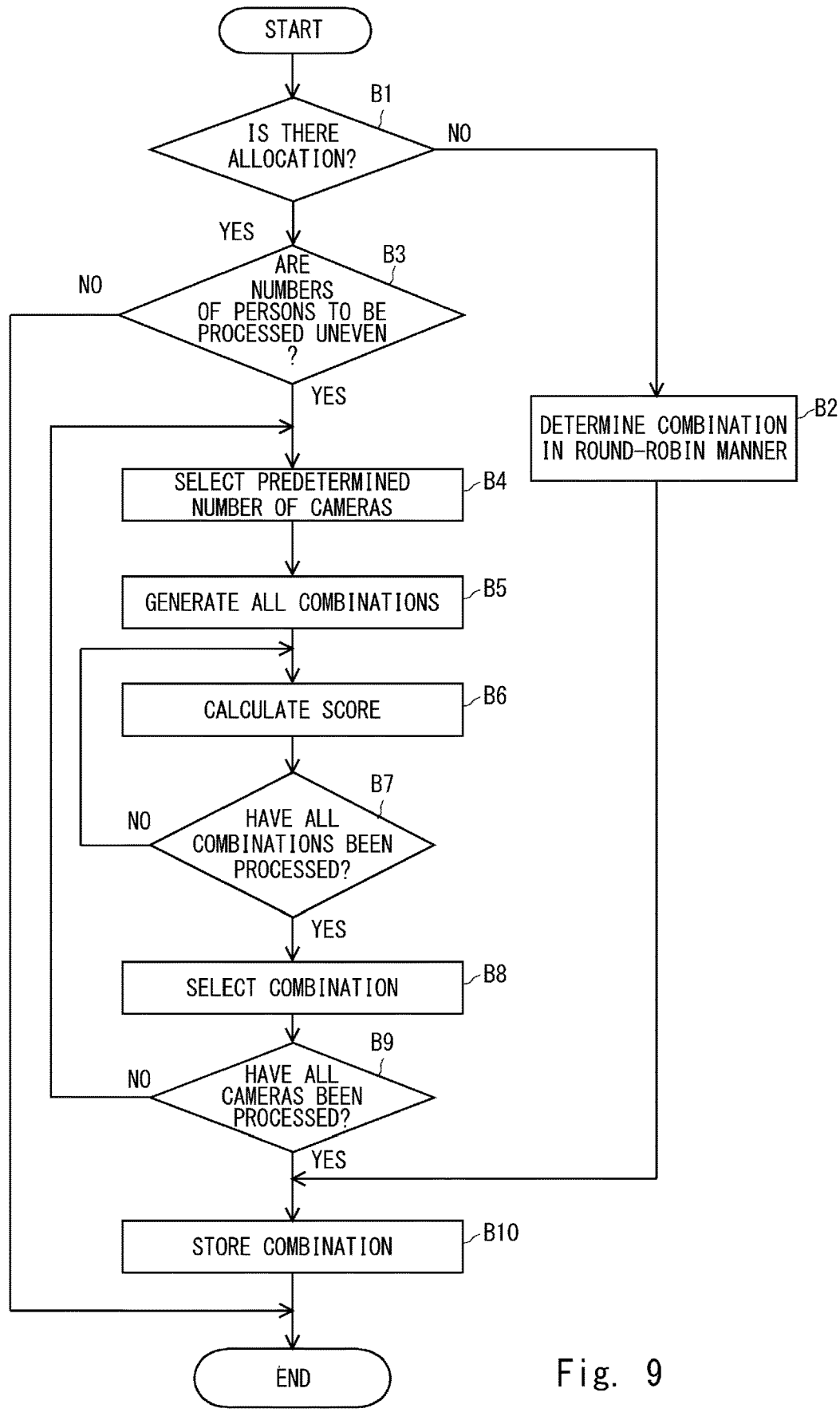
FIG. 9 is a flowchart showing the operation procedure in Step A4 of FIG. 8.

FIG. 9 shows an operation procedure (a server allocation method) in Step A4. The allocation determination unit 204 determines whether or not the combination of the divided data and the server 210 is stored in the allocation storage unit 205 (Step B1). The allocation determination unit 204 determines that the combination is not stored in the allocation storage unit 205 in a first-time server allocation. If the combination is not stored in the allocation storage unit 205, the allocation determination unit 204 determines the combination of the divided data and the server 210 in an order starting from the monitoring camera 101 having a large number of subjects in a round-robin manner (Step B2). The allocation determination unit 204 stores the determined combination in the allocation storage unit 205 (Step B10).

If the allocation determination unit 204 determines in Step B1 that the combination is not stored in the allocation storage unit 205, the allocation determination unit 204 determines whether or not the numbers of persons to be processed are uneven among the respective servers 210 (Step B3). In Step B3, the allocation determination unit 204, for example, calculates the total number of subjects included in the allocated divided data for each server 210, and makes a comparison among the numbers of subjects to be processed by the respective servers. The allocation determination unit 204 calculates an index indicating the unevenness of the numbers of subjects among the respective servers 210, for example, variance, and determines whether or not the variance is equal to or greater than a predetermined threshold. If the variance is equal to or greater than the threshold, the allocation determination unit 204 may determine that there is unevenness in the numbers of persons to be processed. Alternatively, the allocation determination unit 204 may calculate a difference between the maximum value of the number of subjects and the minimum value of the same and compare the calculated difference with the threshold. If the difference is equal to or greater than the threshold, the allocation determination unit 204 may determine that there is unevenness in the numbers of persons to be processed.

For example, when the total number of subjects included in the divided data allocated to a server 1 is "42" and the total number of subjects included in the divided data allocated to a server 2 is "16", the allocation determination unit 204 determines that the numbers of persons to be processed are uneven. When the total number of subjects included in the divided data allocated to the server 1 is "30" and the total number of subjects included in the divided data allocated to the server 2 is "28", the allocation determination unit 204 determines that the number of persons to be processed are not uneven. When the allocation determination unit 204 determines that there is no unevenness in the numbers of persons to be processed, it is not particularly necessary to change the combination of the divided data and the server 210, so that the processing is ended. In this case, it is possible to prevent the data transfer load from increasing by the combination of the divided data and the server 210 being unnecessarily changed, and to prevent a data transfer delay from occurring.

If the allocation determination unit 204 determines in Step B3 that there is no unevenness in the numbers of persons to be processed, the allocation determination unit 204 selects a predetermined number of monitoring cameras from among the unselected monitoring cameras 101 (Step B4). In Step B4, the allocation determination unit 204 sorts, for example, the plurality of monitoring cameras 101 in a descending order based on the number of subjects included in the divided data. In Step B4, the allocation determination unit 204 selects, for example, k×N monitoring cameras 101 in a descending order of the number of subjects, where N is the number of servers 210 and k is any integer equal to or greater than one.

Figure 10:
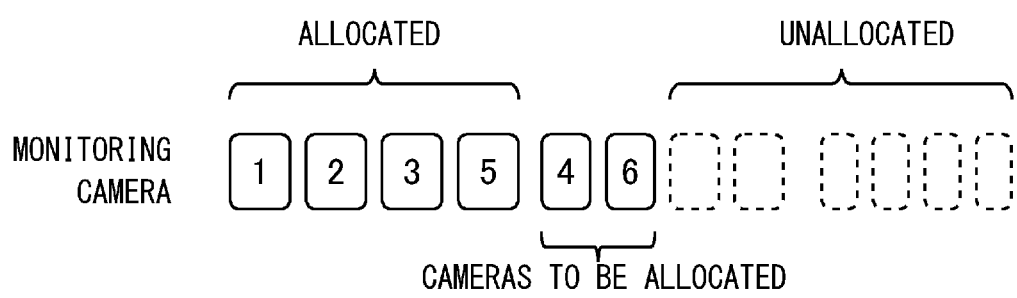
FIG. 10 is a diagram showing a specific example of a selection of a predetermined number of monitoring cameras in Step B4 of FIG. 9.

FIG. 10 shows a specific example of a selection of a predetermined number of monitoring cameras in Step B4. For the sake of simplicity of the description, it is assumed that k=1. Further, it is assumed that the number of servers 210 is N=2. In FIG. 10, the monitoring cameras are sorted in a descending order of the processing loads, that is, in a descending order of the number of subjects included in the divided data. Further, it is assumed that monitoring cameras 1, 2, 3, and 5 have already been allocated to the servers 210. In Step B4, the allocation determination unit 204 selects, from the unallocated monitoring cameras, two monitoring cameras 4 and 6 having the next highest processing load after the allocated monitoring cameras 101. If the number of the unallocated monitoring cameras 101 is less than k×N, the allocation determination unit 204 may select all the unallocated monitoring cameras 101.

Figure 11:
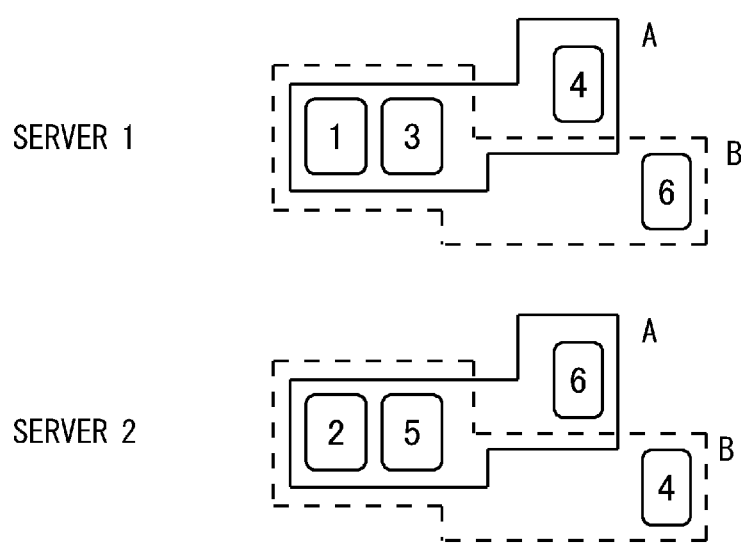
FIG. 11 is a diagram showing a specific example of a combination generated in Step B5 of FIG. 9.

The allocation determination unit 204 generates all combinations of the allocated monitoring camera 101 from which the divided data is acquired and the monitoring camera 101 selected in Step B4 (Step B5). FIG. 11 shows a specific example of a combination generated in Step B5. In FIG. 11, the monitoring cameras 1 and 3 have already been allocated to the server 1, and the monitoring cameras 2 and 5 have already been allocated to the server 2.

In Step B5, the allocation determination unit 204 generates all combinations in which the monitoring cameras 4 and 6 selected in Step B4 are added to the allocated monitoring cameras of the servers 1 and 2. Specifically, the allocation determination unit 204 generates a combination A in which the monitoring camera 4 is allocated to the server 1 in addition to the monitoring cameras 1 and 3 and the monitoring camera 6 is allocated to the server 2 in addition to the monitoring cameras 2 and 2. Further, the allocation determination unit 204 generates a combination B in which the monitoring camera 6 is allocated to the server 1 in addition to the monitoring cameras 1 and 3 and the monitoring camera 4 is allocated to the server 2 in addition to the monitoring cameras 2 and 2.

Further, in Step B5, the allocation determination unit 204 generates a combination matrix C of the server and the monitoring camera corresponding to the generated combination. FIG. 12 shows a specific example of the combination matrix C. In the row of the server 1 of the combination matrix C, the value "1" is stored in the element corresponding to the monitoring camera allocated to the server 1, and the value "0" is stored in the element corresponding to the monitoring camera that is not allocated to the server 1. For example, in FIG. 12, the value of the first row and the fourth column is "1", which means that the divided data of the monitoring camera 4 is allocated to the server 1. The combination matrix C shown in FIG. 12 corresponds to the combination A in FIG. 11. In Step B5, the allocation determination unit 204 also generates a combination matrix corresponding to the combination B in FIG. 11.

The allocation determination unit 204 selects one of the combinations generated in Step B5, and calculates an evaluation value (a score) when the divided data is allocated to the server 210 in this combination (Step B6). In Step B6, the allocation determination unit 204 calculates a score (a load correlation score) for the correlation of the change patterns of the number of subjects among the divided data pieces. Further, the allocation determination unit 204 calculates a score (a load fluctuation score) if for the average staying time of the subjects in the respective divided data pieces. The allocation determination unit 204 further calculates a score (data movement amount score) dt for a transfer (data movement) of the divided data due to the server change.

The aforementioned load correlation score $1c$ indicates, for example, a degree of lowness of the correlation of the change patterns of the number of subjects in the monitoring cameras allocated to the respective servers. In the selected combination, the allocation determination unit 204 calculates a percentage of pairs of monitoring cameras having a high correlation of the change patterns of the number of subjects for each server. A value obtained by subtracting the maximum value of the percentage of the pairs of the monitoring cameras having a high correlation calculated for each server from one is calculated as the load correlation score $c$.

The allocation determination unit 204 calculates, for example, a correlation among the monitoring cameras 1, 3, and 4 allocated to the server 1 in regard to the combination A (see FIG. 11). The allocation determination unit 204 obtains the number of pairs of monitoring cameras of which the correlation is equal to or greater than a threshold, and calculates the percentage of the pairs of monitoring cameras in which the correlation with respect to all the pairs is equal to or greater than the threshold. The allocation determination unit 204 calculates a correlation among the allocated monitoring cameras 2, 5, and 6 for the server 2 like in the case of the server 1, and calculates a percentage of the pairs of the monitoring cameras in which the correlation with respect to all the pairs is equal to or greater than the threshold. The allocation determination unit 204 determines a value obtained by subtracting the maximum value of the percentage of the pairs of the monitoring cameras in which the correlation calculated for each server is equal to or greater than the threshold from one as the load correlation score $1c$. For example, when the percentage of the pairs of the monitoring cameras in which the correlation is equal to or greater than the threshold is 0.33, the allocation determination unit 204 sets 1−0.33=0.67 in the load correlation score $1c$.

The load fluctuation score if indicates, for example, a degree of variation in the staying times of the subjects in the monitoring cameras allocated to the respective servers. The allocation determination unit 204 obtains the staying time of the subject in each monitoring camera. The allocation determination unit 204 calculates an index (a fluctuation coefficient) indicating the fluctuation of the staying time of the subject in the allocated monitoring camera for each server in the selected combination. The allocation determination unit 204 calculates, for example, the variance or the average of the staying time of the subject for each server as the fluctuation coefficient. The allocation determination unit 204 sets the average of the fluctuation coefficients of all the servers in the load fluctuation score $1f$.

FIG. 13 shows a specific example of calculation of the load fluctuation score. Here, it is assumed that the aforementioned combination A (see FIG. 11) is selected in Step B6. Regarding the server 1, the allocation determination unit 204 acquires the average staying time of the subjects in each of the monitoring camera 1 (ID: 001), the monitoring camera 3 (ID: 003), and the monitoring camera 4 (ID: 004). The allocation determination unit 204 calculates the variance of these average staying times as the fluctuation coefficient. For example, in the example of FIG. 13, regarding the server 1, the allocation determination unit 204 calculates 7.93/12.3=0.643 as the fluctuation coefficient of the server 1.

Further, regarding the server 2, the allocation determination unit 204 acquires the average staying time of the subjects in each of the monitoring camera 2 (ID: 002), the monitoring camera 5 (ID: 005), and the monitoring camera 6 (ID: 006). The allocation determination unit 204 calculates the variance of these average staying times as the fluctuation coefficient. For example, in the example of FIG. 13, regarding the server 2, the allocation determination unit 204 calculates 6.23/9.66=0.645 as the fluctuation coefficient of the server 1. The allocation determination unit 204 calculates 0.644, which is the average of the fluctuation coefficient (0.643) of the server 1 and the fluctuation coefficient (0.645) of the server 2, as the load fluctuation score $1f$.

The data movement amount score dt indicates the amount of data moved (the amount of data movement) when the combination of the divided data and the server is changed. The allocation determination unit 204 compares the current combination of the divided data and the server with the combination of the divided data and the server in the selected combination, and specifies the divided data for which the server is to be changed. The allocation determination unit 204 adds up the number of subjects included in the specified divided data. The allocation determination unit 204 calculates a ratio of the number of subjects included in the specified divided data to the total number of subjects included in the respective divided data. The allocation determination unit 204 calculates a value obtained by subtracting the calculated ratio from one as the data amount movement score dt.

FIG. 14 shows a specific example of calculation of the data movement amount score dt. The allocation determination unit 204 determines the number of subjects included in the divided data for each monitoring camera. The number of subjects may be the average of the numbers of subjects in a certain period in the past, or the number of subjects included in the immediately preceding (latest) divided data. The allocation determination unit 204 compares the combination of the divided data and the server stored in the allocation storage unit 205 with the selected combination, specifies the divided data (the monitoring camera) for which the server is to be changed. In the example of FIG. 14, when the combination is changed, the servers that perform the analysis processing on the monitoring camera 4 (ID: 0004) and the monitoring camera 5 (ID: 005) are changed.

The allocation determination unit 204 calculates the sum (22) of the number (5) of subjects included in the divided data of the monitoring camera 4 and the number (17) of subjects included in the divided data of the monitoring camera 5. Further, the allocation determination unit 204 calculates the total number (58) of subjects included in the divided data of the monitoring cameras 1 to 6. The allocation determination unit 204 calculates a ratio (22/5) between the sum (22) and the total number of subjects. The allocation determination unit 204 calculates a value of 1−22/58=0.62 obtained by subtracting the calculated value from one as the data movement amount score dt.

The allocation determination unit 204 calculates the sum of the aforementioned scores 1c, 1f, and dt as a score for the selected combination. The allocation determination unit 204 may multiply each of the scores 1c, 1f, and dt by a weight coefficient, and determine the sum of the obtained values as the score for the selected combination. Specifically, the score for the selected combination may be calculated using the following expression, where w1 is a weight for the score 1c, w2 is a weight for the score 1f, and w3 is a weight for the score dt.

In the above expression, the weights w1, w2, and w3 are set to, for example, values of zero or greater and one or less. Here, it is assumed that w1, w2, and w3 are each 0.33. When the load correlation score 1c is 0.67, the load fluctuation score if is 0.644, and the data movement amount score dt is 0.62, a final score is calculated as follows.

Score=0.33×0.67+0.33+0.644+0.33×0.62=0.64

The allocation determination unit 204 determines whether all the combinations have been selected (Step B7). If the allocation determination unit 204 determines that all the combinations have not been selected, the process returns to Step B6, and the allocation determination unit 204 selects one of the unselected combinations. The allocation determination unit 204 repeats Step B6 until it determines in Step B7 that all the combinations have been selected, and calculates scores for all the combinations generated in Step B5.

The allocation determination unit 204 selects a combination based on the score of each combination calculated in Step B6 (Step B8). In Step B8, the allocation determination unit 204 determines, for example, the combination having the minimum score calculated as described above as the changed combination of the divided data and the server. In above-described Steps, the server 210 to which the divided data of the monitoring camera 101 selected in Step B4 is allocated is determined.

The allocation determination unit 204 determines whether or not all the monitoring cameras 101 have been processed (Step B9). In Step B9, the allocation determination unit 204 determines whether or not there is a monitoring camera 101 that has not been selected in Step B4. If the allocation determination unit 204 determines that all the monitoring cameras 101 have not been processed, the process returns to Step B4, and the allocation determination unit 204 selects the next monitoring camera 101 to be processed. If the allocation determination unit 204 determines in Step B9 that all the monitoring cameras 101 have been processed, the process proceeds to Step B10, and the allocation determination unit 204 stores the combination selected in Step B8 in the allocation storage unit 205.

Figure 15:
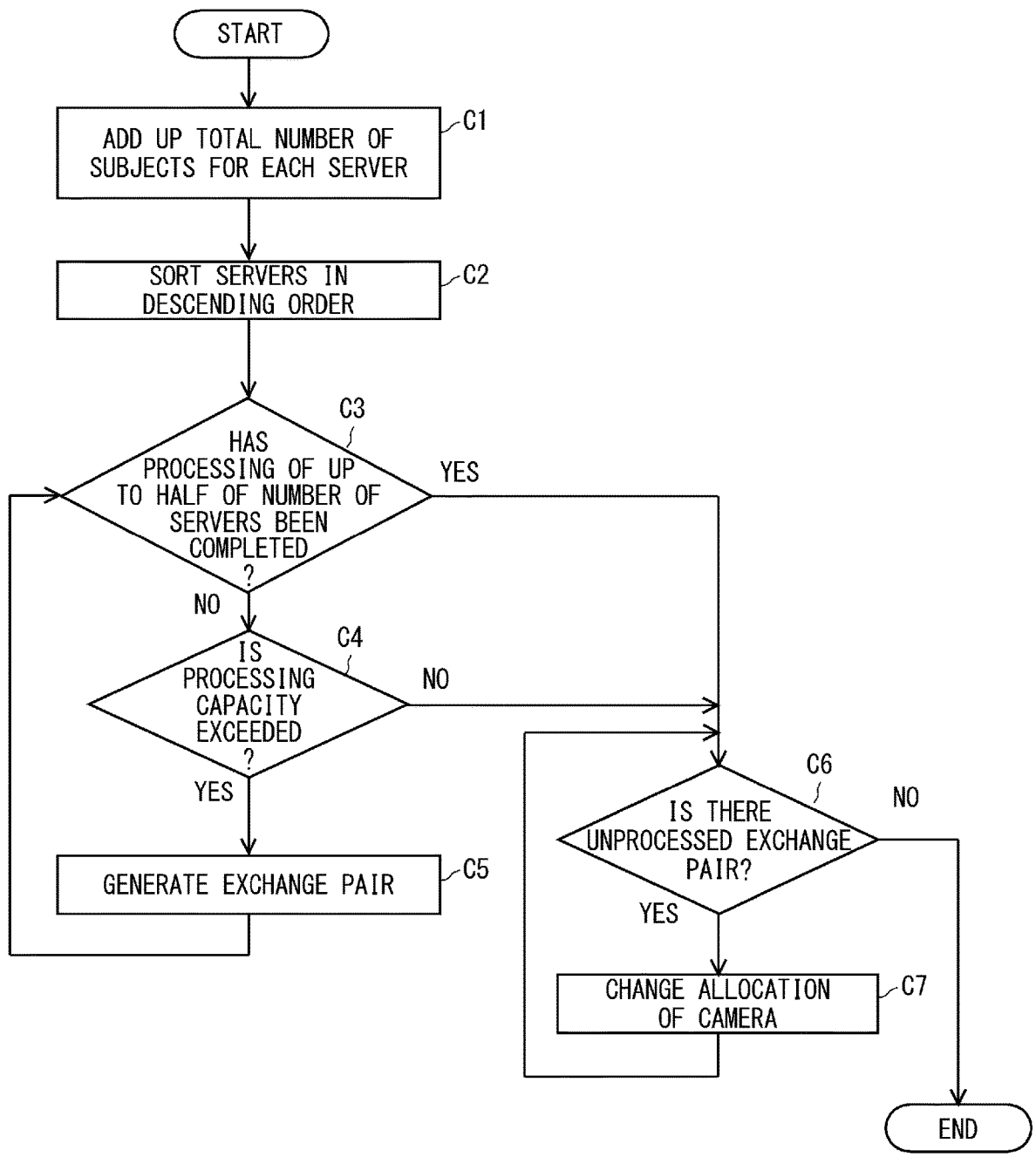
FIG. 15 is a flowchart showing an operation procedure of an adjustment of a combination in Step A5 of FIG. 8.

Referring back to FIG. 8, the allocation adjustment unit 206 adjusts the combination of the divided data and the server 210 stored in the allocation storage unit 205 (Step A5). FIG. 15 is a flowchart showing an operation procedure of the adjustment of the combination in Step A5. The allocation adjustment unit 206 adds up, for each server 210, the total number of subjects included in the divided data to be allocated in accordance with the allocation stored in the allocation storage unit 205 (Step C1). The allocation adjustment unit 206 sorts the servers 210 in a descending order of the total number of the subjects in each of the servers 210 (Step C2).

The allocation adjustment unit 206 determines whether or not processing of up to half of the number of servers 210 sorted in a descending order of the number of subjects has been completed (Step C3). If the allocation adjustment unit 206 determines in Step C3 that processing of up to half of the number of servers 210 has not been completed, the allocation adjustment unit 206 selects one server 210 in an order starting from the server having the largest total number of subjects. The allocation adjustment unit 206 determines whether or not the processing load of the selected server 210 exceeds its processing capacity (Step C4). In Step C4, the allocation adjustment unit 206 compares the predetermined number of subjects set as the processing capacity of the selected server 210 with the total number of subjects in the server 210 added up in Step C1. If the total number of subjects added up does not exceed the number of subjects indicating the processing capacity, the allocation adjustment unit 206 determines that the processing load does not exceed the processing capacity of the server 210.

The allocation adjustment unit 206 determines that the processing load exceeds the processing capacity of the server 210 when the total number of subjects added up exceeds the number of subjects indicating the processing capacity. If allocation adjustment unit 206 determines in Step C4 that the processing load exceeds the processing capacity of the server 210, the allocation adjustment unit 206 generates an exchange pair to which the processing load of the selected server 210 is to be moved (Step C5). In Step C5, the allocation adjustment unit 206 determines, as servers of the exchange pair, servers that have not yet been determined to be the servers to which the processing load is to be moved in an order starting from the server 210 having the smallest total number of the subjects added up in Step C1. After that, the process returns to Step C3, and it is determined whether or not the processing of up to half of the number of servers 210 has been completed.

The allocation adjustment unit 206 repeatedly performs Steps C4 and C5 until it determines in Step C3 that the processing of up to half of the number of servers 210 has been completed, and the allocation adjustment unit 206 determines the server 210 to which the processing load of the server 210 in which the processing load exceeds its processing capacity is to be moved. If the allocation adjustment unit 206 determines in Step C3 that the processing of up to half of the number of servers 210 has been completed, it determines whether or not there is an unprocessed exchange pair (Step C6).

If the allocation adjustment unit 206 determines in Step C6 that an unprocessed exchange pair is present, the allocation adjustment unit 206 changes the allocation of the monitoring camera 101 and the server 210 so that part of the divided data allocated to the server in which it is determined that the processing load exceeds its processing capacity in Step C4 is allocated to the server 210 of the exchange pair (Step C7). After that, the process returns to Step C6, and Step C7 is executed until there are no more unprocessed exchange pairs.

FIG. 16 shows a specific example of the adjustment of the combination. In this example, it is assumed that the allocation storage unit 205 stores the combination matrix C in which the divided data pieces of the monitoring cameras 1, 3, and 4 are allocated to the server 1 and the divided data pieces of the monitoring cameras 2, 5, and 6 are allocated to the server 2. In this case, when the total number of subjects included in the divided data at the time when Step C1 is executed is added up for each server, the total number of subjects in the server 1 is 6+15+2=23. Meanwhile, regarding the server 2, the total number of subjects is 19+23+4=46.

The allocation adjustment unit 206 determines, in regard to the server 2 having a large number of subjects, whether or not the total number of subjects exceeds the processing capacity of the server 2. Here, it is assumed that the processing capacity of the server 2 is 45. The processing capacity of a server is defined, for example, as a value related to the number of subjects that can be processed without causing a load overflow in the server. Since the total number of subjects has exceeded the processing capacity of the server 2, the allocation adjustment unit 206 determines the server 1 having a small number of subjects as an exchange pair.

The allocation adjustment unit 206 moves part of the divided data allocated to the server 2 to the server 1. The allocation adjustment unit 206 moves, for example, the divided data having the smallest number of subjects among the divided data pieces allocated to the server 2 to the server 1. In the example of FIG. 16, the allocation adjustment unit 206 changes the server to which the monitoring camera 6 is to be allocated from the server 2 to the server 1. The allocation adjustment unit 206 stores the adjusted combination of the divided data and the server 210 in the allocation storage unit 205. In this way, it is possible to prevent a load overflow when the number of subjects unexpectedly increases while allocating a large amount of divided data of the monitoring camera 101 to each server 210. Further, by moving the divided data to the server 210 in which the processing load is light, the unevenness in the processing loads among the respective servers can be corrected.

Referring back to FIG. 8 again, the data distribution unit 203 refers to the allocation storage unit 205 and distributes the divided data divided in Step A3 to the server 210 in accordance with the combination of the divided data and the server 210 stored in the allocation storage unit 205 (Step A6). In Step A6, for example, the data distribution unit 203 adds, to each of the divided data pieces divided in Step A3, a server ID that is stored in the allocation storage unit 205 so as to correspond to each of the divided data pieces and transmits these divided data pieces to the analysis unit 208.

In the analysis unit 208, each of the plurality of servers 210 performs analysis processing on the divided data distributed in Step A6 (Step A7). In Step A7, the respective servers 210 execute analysis processing in parallel. Each server 210 outputs a result of the analysis processing to the data output unit 209. The data output unit 209 integrates the result of the analysis processing for each monitoring camera 101 (stream data) and outputs the stream data (the analysis result stream) of the analysis result (Step A8). In Step A8, the data output unit 209 outputs the analysis result stream to at least one of the database 103 and the monitoring terminal 104.

In this example embodiment, the allocation determination unit 204 determines a combination of the divided data and the server 210 so that the divided data pieces of the stream data pieces having high correlations of the change patterns of the processing loads are processed by the servers 210 different from each other as much as possible. By doing so, even when the number of subjects increases at the same timing in some divided data pieces, it is possible to avoid an increase in the processing load in a specific server 210. In this example embodiment, the server 210 processes a plurality of divided data pieces, so that it is possible to increase the utilization efficiency of the server. Further, in this example embodiment, it is possible to prevent a load overflow and to prevent the increase in a delay time until an analysis result is obtained.

Figure 17:
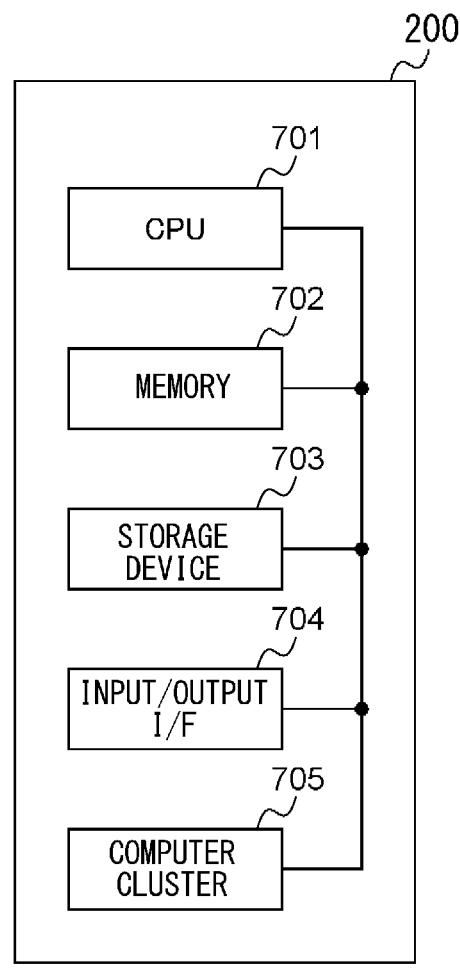
FIG. 17 is a block diagram showing an example of a hardware configuration of the abnormality detection apparatus.

Note that, in the above example embodiment, the abnormality detection apparatus 200 can be configured, for example, as a computer apparatus. FIG. 17 shows an example of a hardware configuration of the abnormality detection apparatus 200. The abnormality detection apparatus 200 includes a CPU 701, a memory 702, a storage device 703, an input/output interface (I/F) 704, and a computer cluster 705. The CPU 701 performs predetermined operations in accordance with a program(s) stored in the memory 702 and/or the storage device 703. Further, the CPU 701 has a function of controlling each unit of the abnormality detection apparatus 200. The CPU 701 executes the processing in accordance with the program, whereby at least some of the functions of the data input unit 201, the data division unit 202, the data distribution unit 203, the allocation determination unit 204, the allocation adjustment unit 206, and the data output unit 209 shown in FIG. 2 are implemented.

The memory 702 includes a volatile memory such as a Random Access Memory (RAM). The memory 702 provides a memory area necessary for the operations of the CPU 701. Further, the memory 702 can be used as a buffer area for implementing the functions of the data input unit 201 and the data output unit 209. The storage device 703 is configured as an auxiliary storage device, such as a flash memory, a Solid State Drive (SSD), or a Hard Disk Drive (HDD). The storage device 703 provides a storage area for implementing the function of the allocation storage unit 205.

The storage device 703 stores, for example, a basic program such as an Operating System (OS) for operating the abnormality detection apparatus 200 and an application program for performing analysis processing. The input/output interface 704 includes a module for communicating with an external apparatus based on standards such as Universal Serial Bus (USB), Ethernet (Registered Trademark), and/or Wi-Fi (Registered Trademark). The computer cluster 705 is a system in which a plurality of computers or processors are coupled to each other. The computer cluster 705 implements the function of the analysis unit 208.

The aforementioned program can be stored using any type of non-transitory computer readable media and provided to the abnormality detection apparatus 200. Non-transitory computer readable media include any type of tangible storage media. Examples of non-transitory computer readable media include magnetic storage media (such as floppy disks, magnetic tapes, hard disks, etc.), optical magnetic storage media (such as magneto-optical disks), optical disc media (such as CD (compact disc), DVD (digital versatile disc), etc.), and semiconductor memories (such as mask ROM (read only memory), PROM (programmable ROM), EPROM (erasable PROM), flash ROM, RAM, etc.). Further, the program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The hardware configuration shown in FIG. 17 is merely an example, and the configuration of the abnormality detection apparatus 200 is not limited to that shown in FIG. 17. The abnormality detection apparatus 200 may have a configuration in which another apparatus is added to the components shown in FIG. 17, and it may not include some components therein. For example, in the abnormality detection apparatus 200, some functions may be provided from other apparatuses via a network, or functions constituting this example embodiment may be distributed to a plurality of apparatuses and implemented.

Note that, in the above example embodiment, although an example in which the stream data 900 is generated from moving image data has been described, the present disclosure is not limited thereto. For example, the stream data 900 may be any data in which the amount of input data changes with the passage of time, and may be moving image data itself. Further, the stream data is not limited to data related to a moving image, and may be audio data or other data such as data input from a large number of sensors. In the above example embodiment, although an example in which the information processing apparatus is configured as the abnormality detection apparatus 200 has been described, the present disclosure is not limited thereto. The information processing apparatus according to the present disclosure is widely applicable to objects to be analyzed for which stream data such as stock price information of a stock exchange, use information of a credit card, or traffic information is generated.

Further, in the above example embodiment, although a description has been given of the example in which the abnormality detection apparatus 200 receives stream data including subject information from the image analysis apparatus 102, the present disclosure is not limited thereto. The abnormality detection apparatus 200 may have a function of the image analysis apparatus 102, and subject information may be generated in the abnormality detection apparatus 200.

In the above example embodiment, although a description has been given of the example in which the load correlation score $1c$ indicates a degree of lowness of the correlation, the load fluctuation score $1f$ indicates a degree of variation in the staying times of subjects, and the data movement amount score dt indicates an amount of movement of data, the present disclosure is not limited thereto. For example, the load correlation score $1c$ may indicate a degree of height of the correlation, the load fluctuation score $1f$ may indicate a degree of smallness of variation in the staying times of the subjects, and the data movement amount score dt may indicate an amount of data that is not moved. In this case, the allocation determination unit 204 may select the combination having the highest score.

The example embodiment according to the present disclosure has been described above in detail. However, the present disclosure is not limited to the example embodiment described above, and the example embodiment to which modifications and corrections have been made without departing from the spirit of the disclosure is included in the present disclosure.

For example, the whole or part of the example embodiment disclosed above can be described as, but not limited to, the following supplementary notes.

(Supplementary Note 1)

An information processing apparatus comprising:

a data division unit configured to divide each of a plurality of stream data pieces input in a time series into divided data by a predetermined time unit;

a plurality of data processing units each configured to execute predetermined processing on the stream data;

an allocation determination unit configured to determine, based on a correlation between processing loads on the plurality of stream data pieces, a combination of the divided data of each of the plurality of stream data pieces and the data processing unit executing the predetermined processing on each of the divided data pieces; and a data distribution unit configured to distribute the divided data to the data processing unit in accordance with the combination determined by the allocation determination unit.

(Supplementary Note 2)

The information processing apparatus according to Supplementary note 1, wherein the allocation determination unit determines the combination so that two pieces of the divided data in which the correlation between the processing loads is equal to or greater than a threshold are processed by the data processing units different from each other.

(Supplementary Note 3)

The information processing apparatus according to Supplementary note 1 or 2, wherein the allocation determination unit selects a predetermined number of the plurality of stream data pieces as stream data pieces to be allocated, and sequentially determines the data processing unit to which the divided data of each of the stream data pieces to be allocated is allocated.

(Supplementary Note 4)

The information processing apparatus according to Supplementary note 3, wherein the allocation determination unit sorts the plurality of stream data pieces in a descending order of the processing loads, and selects the predetermined number of stream data pieces in an order starting from the stream data having a highest processing load.

(Supplementary Note 5)

The information processing apparatus according to Supplementary note 3 or 4, wherein the allocation determination unit selects N×k pieces of the stream data, where N is the number of the data processing units and k is a predetermined integer equal to or greater than one.

(Supplementary Note 6)

The information processing apparatus according to any one of Supplementary notes 3 to 5, wherein the allocation determination unit calculates a correlation between a temporal change of the processing load on each of the stream data pieces from which one or more pieces of the divided data allocated to the data processing unit have been divided and a temporal change of the processing load on each of the stream data pieces to be allocated, calculates, for each of the data processing units, a percentage of the stream data pieces of which the correlations with the temporal changes of the processing loads on the stream data pieces to be allocated are each equal to or greater than a threshold, and allocates the divided data pieces of the stream data pieces to be allocated to the data processing unit in which the percentage is the lowest.

(Supplementary Note 7)

The information processing apparatus according to any one of Supplementary notes 1 to 6, wherein the allocation determination unit further determines the combination of the divided data and the data processing unit based on fluctuation frequencies of the processing loads on the stream data pieces.

(Supplementary Note 8)

The information processing apparatus according to Supplementary note 7, wherein the allocation determination unit obtains, for each of the data processing units, a variation in the fluctuation frequencies of the processing loads on the stream data pieces from which the divided data pieces processed by the same data processing unit have been divided, and determines the combination of the divided data and the data processing unit based on the variation.

(Supplementary Note 9)

The information processing apparatus according to any one of Supplementary notes 1 to 8, wherein a time width of the stream data referred to by the predetermined processing that is executed by the data processing unit is shorter than a time width of the divided data, and when the data processing unit to which the divided data is to be allocated is changed, the allocation determination unit evaluates an amount of data transferred to the changed data processing unit to which the divided data is to be allocated, and determines the combination of the divided data and the data processing unit based on a result of the evaluation as well as the correlation between the processing loads and the fluctuation frequencies of the processing loads.

(Supplementary Note 10)

The information processing apparatus according to Supplementary note 9, wherein the allocation determination unit calculates a load correlation score indicating a degree of lowness of the correlation between the processing loads based on the percentage of the stream data pieces of which the correlations with the temporal changes of the processing loads on the stream data pieces to be allocated are each equal to or greater than the threshold, calculates a load fluctuation score indicating a degree of variation in the fluctuation frequencies of the processing loads, calculates a data movement amount score indicating the amount of data transferred to the changed data processing unit to which the divided data is to be allocated, and determines the combination of the divided data and the data processing unit based on a sum of the load correlation score, the load fluctuation score, and the data movement amount score.

(Supplementary Note 11)

wherein the allocation determination unit calculates, as the load correlation score, a value obtained by subtracting from one a maximum value of the percentage of the stream data pieces of which the correlations calculated for each of the data processing units are each equal to or greater than the threshold.

(Supplementary Note 12)

The information processing apparatus according to Supplementary note 10 or 11, wherein the allocation determination unit calculates the load fluctuation score based on an average value of the degree of variation in the fluctuation frequencies of the processing loads calculated for each of the data processing units.

(Supplementary Note 13)

The information processing apparatus according to any one of Supplementary notes 10 to 12, wherein the allocation determination unit compares the combination that has not been changed with the combination that has been changed, adds up values related to a data amount of the divided data for which the data processing unit to which the divided data is to be allocated is changed, and calculates a ratio of the added up values to a sum of the values related to the data amount of the divided data, and calculates a value obtained by subtracting the ratio from one as the data movement amount score.

(Supplementary Note 14)

The information processing apparatus according to any one of Supplementary notes 10 to 13, wherein the allocation determination unit respectively multiplies the load correlation score, the load fluctuation score, and the data movement amount score by weights and performs weighted addition on the load correlation score, the load fluctuation score, and the data movement amount score.

(Supplementary Note 15)

The information processing apparatus according to any one of Supplementary notes 10 to 14, wherein the allocation determination unit determines, as a new combination, the combination of the divided data and the data processing unit in which the sum of the load correlation score, the load fluctuation score, and the data movement amount score becomes minimum.

(Supplementary Note 16)

The information processing apparatus according to any one of Supplementary notes 1 to 15, further comprising an allocation adjustment unit configured to evaluate the processing load of each of the data processing units when the divided data is allocated to the data processing unit in the combination determined by the allocation determination unit and adjusting the combination based on a result of the evaluation.

(Supplementary Note 17)

The information processing apparatus according to Supplementary note 16, wherein when there is data processing unit in which the processing load exceeds a processing capacity thereof, the allocation adjustment unit adjusts the combination so that part of the divided data allocated to the data processing unit is moved to another data processing unit.

(Supplementary Note 18)

The information processing apparatus according to Supplementary note 17, wherein the allocation adjustment unit determines, in an order starting from the data processing unit having a lowest processing load, the data processing unit to which the part of the divided data allocated to the data processing unit in which the processing load exceeds the processing capacity thereof is to be moved.

(Supplementary Note 19)

The information processing apparatus according to any one of Supplementary notes 1 to 18, wherein the stream data includes subject information detected from moving image data.

(Supplementary Note 20)

A server allocation apparatus comprising:

a data division unit configured to divide each of a plurality of stream data pieces input in a time series into divided data by a predetermined time unit; and an allocation determination unit configured to determine, based on a correlation between processing loads on the plurality of stream data pieces, a combination of a plurality of data processing units each executing predetermined processing on the stream data and the divided data of each of the plurality of stream data pieces.

(Supplementary Note 21)

The server allocation apparatus according to Supplementary note 20, wherein the allocation determination unit determines the combination so that two pieces of the divided data in which the correlation between the processing loads is equal to or greater than a threshold are processed by the data processing units different from each other.

(Supplementary Note 22)

The server allocation apparatus according to Supplementary note 20 or 21, wherein the allocation determination unit further determines the combination of the divided data and the data processing unit based on fluctuation frequencies of the processing loads on the stream data pieces.

(Supplementary Note 23)

The server allocation apparatus according to any one of Supplementary notes 20 to 22, wherein a time width of the stream data referred to by the predetermined processing that is executed by the data processing unit is shorter than a time width of the divided data, and when the data processing unit to which the divided data is to be allocated is changed, the allocation determination unit evaluates an amount of data transferred to the changed data processing unit to which the divided data is to be allocated, and determines the combination of the divided data and the data processing unit based on a result of the evaluation as well as the correlation between the processing loads and the fluctuation frequencies of the processing loads.

(Supplementary Note 24)

The server allocation apparatus according to any one of Supplementary notes 20 to 23, further comprising an allocation adjustment unit configured to evaluate the processing load of each of the data processing units when the divided data is allocated to the data processing unit in the combination determined by the allocation determination unit and adjusting the combination based on a result of the evaluation.

(Supplementary Note 25)

A server allocation method comprising:

dividing each of a plurality of stream data pieces input in a time series into divided data by a predetermined time unit; and determining, based on a correlation between processing loads on the plurality of stream data pieces, a combination of a plurality of servers and the divided data of each of the plurality of stream data pieces, each of the plurality of servers being configured to execute predetermined processing on the stream data.

(Supplementary Note 26)

A computer readable medium storing a program for causing a computer to:

divide each of a plurality of stream data pieces input in a time series into divided data by a predetermined time unit; and determine, based on a correlation between processing loads on the plurality of stream data pieces, a combination of one of a plurality of servers and the divided data of each of the plurality of stream data pieces, each of the plurality of servers being configured to execute predetermined processing on the stream data.

REFERENCE SIGNS LIST

10 INFORMATION PROCESSING APPARATUS
11 DATA DIVISION MEANS
12 DATA PROCESSING MEANS
13 ALLOCATION DETERMINATION MEANS
14 DATA DISTRIBUTION MEANS
100 MONITORING SYSTEM
101 MONITORING CAMERA
102 IMAGE ANALYSIS APPARATUS
103 DATABASE
104 MONITORING TERMINAL
200 ABNORMALITY DETECTION APPARATUS
201 DATA INPUT UNIT
202 DATA DIVISION UNIT
203 DATA DISTRIBUTION UNIT
204 ALLOCATION DETERMINATION UNIT
205 ALLOCATION STORAGE UNIT
206 ALLOCATION ADJUSTMENT UNIT
208 ANALYSIS UNIT
209 DATA OUTPUT UNIT
210 SERVER

What is claimed is:

1. An information processing apparatus including a plurality of data processing units, the information processing apparatus comprising:

at least one memory configured to store instructions; and at least one processor configured to execute the instructions to:

divide each of a plurality of stream data pieces input in a time series into divided data by a predetermined time unit;

execute predetermined processing on the stream data by each of the plurality of data processing units;

determine, based on a correlation between processing loads on the plurality of stream data pieces, a combination of the divided data of each of the plurality of stream data pieces and the data processing unit executing the predetermined processing on each of the divided data pieces;

distribute the divided data to the data processing unit in accordance with the determined combination;

select a predetermined number of the plurality of stream data pieces as stream data pieces to be allocated, and sequentially determine the data processing unit to which the divided data of each of the stream data pieces to be allocated is allocated; and sort the plurality of stream data pieces in a descending order of the processing loads, and select the predetermined number of stream data pieces in an order starting from the stream data having a highest processing load.

2. The information processing apparatus according to claim 1, wherein the at least one processor is configured to determine the combination so that two pieces of the divided data in which the correlation between the processing loads is equal to or greater than a threshold are processed by the data processing units different from each other.

3. The information processing apparatus according to claim 1, wherein the at least one processor is configured to select N×k pieces of the stream data, where N is the number of the data processing units and k is a predetermined integer equal to or greater than one.

4. The information processing apparatus according to claim 1, wherein the at least one processor is configured to calculate a correlation between a temporal change of the processing load on each of the stream data pieces from which one or more pieces of the divided data allocated to the data processing unit have been divided and a temporal change of the processing load on each of the stream data pieces to be allocated, calculate, for each of the data processing units, a percentage of the stream data pieces of which the correlations with the temporal changes of the processing loads on the stream data pieces to be allocated are each equal to or greater than a threshold, and allocate the divided data pieces of the stream data pieces to be allocated to the data processing unit in which the percentage is the lowest.

5. The information processing apparatus according to claim 1, wherein the at least one processor is further configured to determine the combination of the divided data and the data processing unit based on fluctuation frequencies of the processing loads on the stream data pieces.

6. The information processing apparatus according to claim 5, wherein the at least one processor is configured to obtain, for each of the data processing units, a variation in the fluctuation frequencies of the processing loads on the stream data pieces from which the divided data pieces processed by the same data processing unit have been divided, and determine the combination of the divided data and the data processing unit based on the variation.

7. The information processing apparatus according to claim 1, wherein a time width of the stream data referred to by the predetermined processing that is executed by the data processing unit is shorter than a time width of the divided data, and when the data processing unit to which the divided data is to be allocated is changed, the at least one processor is configured to evaluate an amount of data transferred to the changed data processing unit to which the divided data is to be allocated, and determine the combination of the divided data and the data processing unit based on a result of the evaluation as well as the correlation between the processing loads and the fluctuation frequencies of the processing loads.

8. The information processing apparatus according to claim 7, wherein the at least one processor is configured to calculate a load correlation score indicating a degree of lowness of the correlation between the processing loads based on the percentage of the stream data pieces of which the correlations with the temporal changes of the processing loads on the stream data pieces to be allocated are each equal to or greater than the threshold, calculate a load fluctuation score indicating a degree of variation in the fluctuation frequencies of the processing loads, calculates a data movement amount score indicating the amount of data transferred to the changed data processing unit to which the divided data is to be allocated, and determine the combination of the divided data and the data processing unit based on a sum of the load correlation score, the load fluctuation score, and the data movement amount score.

9. The information processing apparatus according to claim 8, wherein the at least one processor is configured to calculate, as the load correlation score, a value obtained by subtracting from one a maximum value of the percentage of the stream data pieces of which the correlations calculated for each of the data processing units are each equal to or greater than the threshold.

10. The information processing apparatus according to claim 8, wherein the at least one processor is configured to calculate the load fluctuation score based on an average value of the degree of variation in the fluctuation frequencies of the processing loads calculated for each of the data processing units.

11. The information processing apparatus according to claim 8, wherein the at least one processor is configured to compare the combination that has not been changed with the combination that has been changed, add up values related to a data amount of the divided data for which the data processing unit to which the divided data is to be allocated is changed, and calculate a ratio of the added up values to a sum of the values related to the data amount of the divided data, and calculates a value obtained by subtracting the ratio from one as the data movement amount score.

12. The information processing apparatus according to claim 8, wherein the at least one processor is configured to multiple the load correlation score, the load fluctuation score, and the data movement amount score by weights respectively and perform weighted addition on the load correlation score, the load fluctuation score, and the data movement amount score.

13. The information processing apparatus according to claim 8, wherein the at least one processor is configured to determine, as a new combination, the combination of the divided data and the data processing unit in which the sum of the load correlation score, the load fluctuation score, and the data movement amount score becomes minimum.

14. The information processing apparatus according to claim 1, the at least one processor is further configured to evaluate the processing load of each of the data processing units when the divided data is allocated to the data processing unit in the determined combination and adjusting the combination based on a result of the evaluation.

15. A server allocation apparatus comprising:
at least one memory configured to store instructions; and
at least one processor configured to execute the instructions to:
divide each of a plurality of stream data pieces input in a time series into divided data by a predetermined time unit;
determine, based on a correlation between processing loads on the plurality of stream data pieces, a combination of a plurality of data processing units each executing predetermined processing on the stream data and the divided data of each of the plurality of stream data pieces;
select a predetermined number of the plurality of stream data pieces as stream data pieces to be allocated, and sequentially determine the data processing unit to which the divided data of each of the stream data pieces to be allocated is allocated; and
sort the plurality of stream data pieces in a descending order of the processing loads, and select the predetermined number of stream data pieces in an order starting from the stream data having a highest processing load.

16. The server allocation apparatus according to claim 15, wherein the at least one processor is configured to determine the combination of the divided data and the data processing unit based on fluctuation frequencies of the processing loads on the stream data pieces.

17. The server allocation apparatus according to claim 15, wherein
a time width of the stream data referred to by the predetermined processing that is executed by the data processing unit is shorter than a time width of the divided data, and when the data processing unit to which the divided data is to be allocated is changed, the at least one processor is configured to evaluate an amount of data transferred to the changed data processing unit to which the divided data is to be allocated, and determine the combination of the divided data and the data processing unit based on a result of the evaluation as well as the correlation between the processing loads and the fluctuation frequencies of the processing loads.

18. A server allocation method comprising:
dividing each of a plurality of stream data pieces input in a time series into divided data by a predetermined time unit;
determining, based on a correlation between processing loads on the plurality of stream data pieces, a combination of a plurality of servers and the divided data of each of the plurality of stream data pieces, each of the plurality of servers being configured to execute predetermined processing on the stream data;
select a predetermined number of the plurality of stream data pieces as stream data pieces to be allocated, and sequentially determine the data processing unit to which the divided data of each of the stream data pieces to be allocated is allocated; and
sort the plurality of stream data pieces in a descending order of the processing loads, and select the predetermined number of stream data pieces in an order starting from the stream data having a highest processing load.

* * * * *